(12) United States Patent
Castro

(10) Patent No.: US 12,537,754 B2
(45) Date of Patent: Jan. 27, 2026

(54) METHOD AND SYSTEM FOR PREDICTING USER SENTIMENT

(71) Applicant: Ookla, LLC, New York, NY (US)

(72) Inventor: Cristhian Castro, Lima (PE)

(73) Assignee: Ookla, LLC, New York, NY (US)

( * ) Notice: Subject to any disclaimer, the term of this patent is extended or adjusted under 35 U.S.C. 154(b) by 240 days.

(21) Appl. No.: 18/479,561

(22) Filed: Oct. 2, 2023

(65) Prior Publication Data

US 2025/0112847 A1    Apr. 3, 2025

(51) Int. Cl.
*H04L 43/0894* (2022.01)
*H04L 41/16* (2022.01)
*H04L 43/087* (2022.01)

(52) U.S. Cl.
CPC .......... *H04L 43/0894* (2013.01); *H04L 41/16* (2013.01); *H04L 43/087* (2013.01)

(58) Field of Classification Search
None
See application file for complete search history.

(56) References Cited

U.S. PATENT DOCUMENTS

| | | | | |
|---|---|---|---|---|
| 2014/0297764 A1* | 10/2014 | Skiba | ............... | H04L 51/046 709/206 |
| 2021/0209306 A1* | 7/2021 | Kvochko | ............... | G06F 40/30 |
| 2022/0377582 A1 | 11/2022 | Sakamoto et al. | | |
| 2023/0188527 A1* | 6/2023 | O'Neill | ............... | H04L 63/1408 726/10 |

OTHER PUBLICATIONS

Notification of Transmittal of the International Search Report and The Written Opinion of the International Searching Authority and The Declaration issued for PCT Patent Application No. PCT/US24/40910, mailed on Nov. 21, 2024, 14 pages.
Jahveri Sneha et al.; "A QoS and QoE Based Integrated Model for Bidirectional Web Service Recommendation;" 2018 Pacific Neighborhood Consortium Annual Conference and Joint Meetings (PNC); Oct. 27, 2018, pp. 1-6; retrieved online Dec. 14, 2018, DOI: 10.23919/PNC 2018.8579474.
Jinfeng Wen et al.; "Characterizing Commodity Serverless Computing Platforms;" arxiv.org; Cornell University Library; 201 Olin Library Cornell University, Ithaca, New York 14853; Feb. 6, 2023; XP091428945; Chapter 4; p. 8.
Shuang Shu et al.; "Modular and Deep QoS/QoE Mapping for Multimedia Services Over Satellite Networks;" International Journal for Communication Systems, Wiley Chichester, GB, vol. 31, No. 17; XP071994967; ISSN: 1074-5351; DOI 10.1002/DAC .3793; Chapter 3.

* cited by examiner

*Primary Examiner* — Angela Nguyen
(74) *Attorney, Agent, or Firm* — Aikin & Gallant, LLP

(57) ABSTRACT

Methods and systems are described for predicting user (client or customer) sentiment associated with internet speed tests. In one embodiment, a system receives internet speed test data of an internet speed test performed on a data connection between a client device and a remote server. The system determines whether there is a user-provided sentiment score associated with the internet speed test data, and in response to determining that there isn't the user-provided sentiment score, produces, using the internet speed test data as input into a machine learning (ML) model, a predicted user-sentiment score as output of the ML model, wherein the predicted user-sentiment score relates to overall sentiment of a user of the client device with respect to the internet speed test data.

20 Claims, 3 Drawing Sheets

METHOD AND SYSTEM FOR PREDICTING USER SENTIMENT

FIELD

An embodiment of the disclosure is related to methods and systems for predicting user sentiment associated with internet speed tests. Other embodiments are also described.

BACKGROUND

In recent years, with the proliferation of media streaming devices, such as computer tablets and smart-phones, users stream a considerable amount of data. For example, to stream a 4K motion picture requires approximately nine gigabytes (GBs) for each hour of the motion picture. As a result, computing networks to which the media streaming devices connect to the Internet require a high bandwidth to handle the data, where bandwidth relates to a capacity at which a network can transmit data. In particular, bandwidth may be the maximum sending rate (or maximum sending rate) that the underlying network may achieve without (or with minimal) loss. This is especially the case in which multiple computing devices are exchanging data across a given network.

SUMMARY

Bandwidth (e.g., internet speed) of an internet connection may be measured through the use of an internet speed test, which may be offered by a speed test provider. To perform a speed test, a client device (e.g., desktop computer, smart-phone, etc.) may request an internet speed test server to transmit as much data as possible in order to load an internet connection to its saturation point. Once the saturation point is deemed "reached" after the transmission of all of the requested data to the client device, or a timer expires, the client device determines and records the bandwidth by measuring the rate at which data is received or by determining how long it takes for the requested amount of data to be transmitted, for example. The results of the speed test, which may include information such as a download speed and/or an upload speed may be presented to a user of the client device through a graphical user interface (GUI) displayed on a display of the client device.

At the end of a speed test, once the results are displayed within the GUI, the speed test provider may provide the user with the ability to submit feedback (e.g., through a user interface (UI) in the GUI) regarding their satisfaction with the results of the speed test. Such feedback may provide critical insight into customer sentiment with respect to the customer's internet speed. For example, customers may provide feedback indicating low satisfaction when the results indicate that the customer's speed is low (e.g., below a threshold). This insight may empower network operators (providers) to proactively address customer concerns and optimize their services in order to address low customer satisfaction. For example, operators may upgrade network infrastructure to improve network bandwidth or may provide customers with incentives, such as discounts based on the feedback. This proactive approach for network operators may lead to improved customer satisfaction, retention, and overall business success. Generally, however, customers do not provide a sufficient amount of feedback with which network operators may analyze to provide a comprehensive understanding of customer satisfaction. In fact, customer feedback is only submitted for approximately 2% of the total number of performed speed tests. Therefore, there is a need for predicting (estimating) customer (user) sentiment of internet speed tests.

The instant disclosure is directed to a method and system for predicting user sentiment of internet speed tests using a machine learning (ML) model. For instance, the system may receive internet speed test data of an internet speed test performed on a data connection between a (first) client device and a remote server. The system may determine whether there is a user-provided sentiment score (or user feedback) associated with the internet speed test data. In particular, the system may determine a user of the client device has provided feedback, through a selection of one or more UI items of a GUI displayed on the client device, for example. In response to determining that there isn't user-provided sentiment score associated with the internet speed test data, the system may produce, using the test data as input into the ML model, a predicted user-sentiment score as output of the ML model, where the predicted score relates to an overall sentiment of a user of the client device with respect to the internet speed test data. In one embodiment, the ML model may be trained using training data that includes internet speed test data of several internet speed tests and includes user-provided sentiment scores associated with the data of the internet speed tests. Internet speed test (and/or training) data may include at least one of a download speed, an upload speed, a ratio of download speed to upload speed (DL/UL), jitter, latency, and a geographical region in which the client device is located. Thus, by utilizing machine learning techniques and analyzing various factors of internet speed test data, the present disclosure provides insights into user satisfaction levels, which may be used to improve the overall user experience.

As described herein, the ML model may be trained to output predicted user-sentiment scores based on internet speed test data. In one embodiment, the ML model may take into account a location of a client device when producing the predicted scores. For instance, users of different regions (e.g., different cities) may (e.g., on average) provide differing feedback for similar or same speed test results. In particular, the system may receive a second set of internet speed test data of a second internet speed test performed on a second data connection between a second client device and the remote server, where the second client device is at a second geographical region (e.g., in a different city than the first client device), where the second set of internet speed test data includes at least one same piece of data as the first set of internet speed test data of the speed test performed between the first client device and the remote server, such as a same ratio of DL/UL. The system produces, using the second set of internet speed test data as input into the ML model, a second predicted user-sentiment score as output of the ML model, where the second predicted user-sentiment score is different than the first predicted user-sentiment score. This may be due to various reasons, such as the first region may be used to (e.g., on average) having higher internet speeds than the second region (e.g., due to customers of the first region having a better upgraded network infrastructure than the second region). As a result, the ML model may produce a lower predicted user-sentiment score for users of the first region, while producing a higher predicted user-sentiment score for users of the second region, when speed tests of both users produce similar or the same results.

In one embodiment, the instant disclosure may account for outlier client feedback. In general, a customer who provides feedback may experience worse test results than others within their geographical region. This may be due to network issues that may be specific to that customer (e.g., faulty network equipment). The predicted user-sentiment score may be greater (or less than) an average user-provided sentiment score of several internet speed tests performed for several other client devices located within the same reason. As a result, the system may provide a more accurate user sentiment that may be higher than the user-provided sentiment.

In another embodiment, in response to the system determining that there is user-provided sentiment score associated with the internet speed test data, the system may train the ML model using the user-provided sentiment score and at least some of the internet speed test data. In some embodiments, the ML model may be at least one of a Random Forest, a Randomized Search, a neural network, and a regression model. In another embodiment, the operations described herein may be performed by the remote server, which may be operated by an internet speed test provider.

According to another embodiment of the disclosure is a server that includes at least one processor; and memory having stored therein instructions which when executed by the at least one processor causes the server to: determine internet speed test data of an internet speed test performed for a data connection with a client device; determine whether the client device has provided feedback relating to the internet speed test data; in response to determining that the client device has not provided feedback, estimating, using a machine learning (ML) model, a predicted user-sentiment score based on at least a portion of the internet speed test data, where the predicted user-sentiment score relates to user sentiment of the internet speed test data; and store the predicted user-sentiment score in the memory. In one embodiment, the server may perform at least some operations as described herein.

According to another embodiment of the disclosure is a non-transitory machine-readable medium having stored therein instructions which when executed by at least one processor of an electronic device causes the electronic device to: receive internet speed test data of an internet speed test performed on a data connection between a client device and a remote server, where the internet speed test data does not comprise user-feedback from the client device; and use the internet speed test data as input into a machine learning (ML) model, a predicted user-sentiment score as output of the ML model, where the predicted user-sentiment score relates to overall sentiment of a user of the client device with respect to the internet speed test data. In one embodiment, the non-transitory machine-readable medium having instructions stored therein which when executed cause the electronic device to perform at least some of the operations described herein.

In one embodiment, the ML model may be trained using past internet speed test data that includes user-feedback from other client devices within a same geographical region as the client device. As a result, different ML models may be trained to predict sentiment for different regions, using feedback from client devices within those regions. This may provide a more accurate user sentiment of people within that region.

The above summary does not include an exhaustive list of all embodiments of the present disclosure. It is contemplated that the disclosure includes all systems and methods that can be practiced from all suitable combinations of the various embodiments summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

DETAILED DESCRIPTION

Several embodiments of the disclosure with reference to the appended drawings are now explained. Whenever embodiments of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases do not necessarily refer to the same embodiment.

Figure 1:
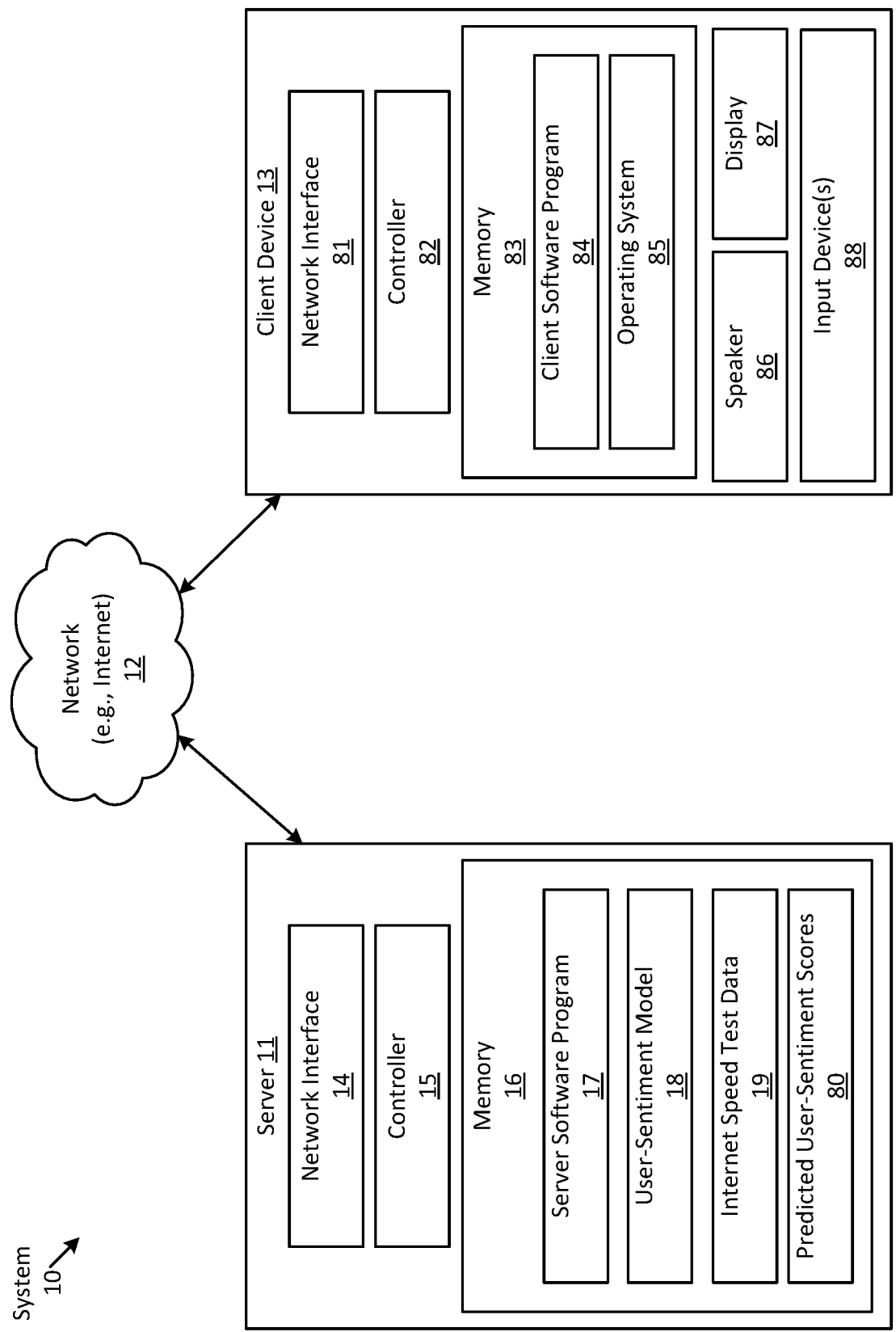
FIG. 1 is a block diagram illustrating a predictive user sentiment system, according to some embodiments.

FIG. 1 is a block diagram illustrating a user (customer or client) sentiment predictive system (hereafter referred to as "system") 10, according to some embodiments. The system 10 includes a client (customer or user) device 13 that may be owned and/or operated by one or more users, a (remote) server 11, and a network (e.g., Internet) 12. In one embodiment, the system may include more devices, such as having one or more servers or one or more client devices. In another embodiment, the system 10 may include one or more additional devices that may be communicatively coupled with the client device 13.

The server 11 and the client device 13 may each be any type of electronic device that may be capable of establishing a data connection via one or more networks for exchanging data (e.g., as data packets) in order to perform an internet speed test upon the data connection. For example, the client device may be a tablet computer, a desktop computer, a mobile device (e.g., a smartphone), a media playback device, etc. In another embodiment, the client device may be any type of network device, such as a server, a router, a hub, etc. In one embodiment, the server may include a stand-alone electronic server, or may include one or more servers.

In another embodiment, the server may be any type of electronic device, such as a desktop computer.

The client device 13 includes a network interface 81, a controller 82, memory 83, a speaker 86, a display 87, and an input device 88. In one embodiment, the client device may include more or less elements shown herein. For example, the client device may include one or more speakers, displays, and/or input devices. As another example, the device 13 may not include a speaker, a display, and/or an input device. In one embodiment, the elements of the client device may be a part of the client device. For instance, the elements may be integrated within (or on) a housing (not shown) of the client device 13. In another embodiment, at least some elements may be separate electronic devices that may be communicatively coupled with the client device. As an example, the display 87 may be a separate display that may be connected to the client device to receive image data for display.

The network interface 81 may provide an interface for the client device 13 to communicate with electronic devices, via the network 12, such as the server 11. For example, the network interface may be configured to establish a data connection (e.g., communication link) with (e.g., the network interface 14 of) the server 11, and once established exchange digital data, as described herein. In one embodiment, the network 12 may be any type of computer network, such as a wide area network (WAN) (e.g., the Internet), a local area network (LAN), etc., through which the devices may exchange data between one another and/or may exchange data with one or more other electronic devices. In another embodiment, the network may be a wireless network such as a wireless local area network (WLAN), a cellular network, etc., in order to exchange digital (e.g., test) data. With respect to the cellular network, the device 13 may be configured to establish a wireless (e.g., cellular) call, in which the cellular network may include one or more cell towers, which may be part of a communication network (e.g., a 4G Long Term Evolution (LTE) network, a 5G network, etc.) that supports data transmission (and/or voice calls) for electronic devices, such as mobile devices (e.g., smartphones). In one embodiment, the device 13 may be configured to communicate with one or more devices via the network 12 using any type of communication protocol, such as Transmission Control Protocol/Internet Protocol (TCP/IP), Quick User Datagram Protocol (UDP) Internet Connections (QUIC), etc.

In another embodiment, the devices may be configured to wirelessly exchange data via other networks, such as a Wireless Personal Area Network (WPAN) connection. For instance, the client device 13 may be configured to establish a wireless connection with another electronic device via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital data.

The input device 88 may be any type of device that may be arranged to receive user input. For example, the device 88 may include a keyboard, one or more buttons, a mouse, etc. In another embodiment, the input device 88 may be a part of the display 87, whereby the display may be a touch-sensitive display screen that may be arranged to receive user input through one or more user touches.

The controller 82 may be (or include) a special-purpose processor (e.g., one or more processors) such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller may be configured to perform one or more internet speed test operations, and/or networking operations, as described herein. More about the operations performed by the controller are described herein.

The memory 83 may be any type of non-transitory machine-readable storage medium, such as read-only memory, random-access memory, CD-ROMS, DVDs, magnetic tape, optical data storage devices, flash memory devices, and phase change memory. Although illustrated as being contained within the device 13, one or more components may be a part of separate electronic devices, such as the memory being a separate data storage device.

As shown, the memory 83 includes a (or one or more) client software program 84 and an operating system 85. The operating system (OS) 85 may be a software component that is responsible for management and coordination of activities and the sharing of resources (e.g., controller resources, memory, etc.) of the device 13. In one embodiment, the OS acts as a host for application programs (e.g., program 84) that run on the device 13. In one embodiment, the OS provides an interface to a hardware layer (e.g., the controller, memory, etc.), and may include one or more software drivers that communicate with the hardware layer. For example, the drivers can receive, and process data packets received through the hardware layer from one or more other devices that are communicatively coupled to the device. In one embodiment, the OS may include (or be a part of) a kernel that provides an interface between the one or more programs that may be executed by (e.g., the controller 82) and the hardware layer.

The client software program 84 may be any type of software application (that may include one or more instructions and), which when executed (e.g., by the controller 82) causes the device 13 to communicate over the network 12 and perform one or more internet speed test operations. For example, the program may be capable of causing the client device (e.g., via the network interface 81) to exchange messages over the network 12 with the server 11 using any type of communication protocol (e.g., Hypertext Transfer Protocol (HTTP), HTTPS, etc.) using any type of communication protocol, such as TCP/IP, QUIC, etc. In one embodiment, the program 84 may be any application that may be capable of interacting with a web-based application, through which the internet speed test may be performed. In one embodiment, the software program may be an internet speed test application, which when executed by establish a data connection with one or more devices to determine internet speed test data (e.g., one or more data connection characteristics), such as bandwidth. In particular, the software program may establish a TCP data connection (or QUIC connection) with the server 11, which when established may transmit a request to initiate an internet speed test, where the server may transmit (e.g., test) data, as described herein. In one embodiment, the program may be configured to access a web browser (e.g., which may be hosted by the server 11), through which a test may be performed. Once the test data has been transmitted (or a time has expired), the client software program 84 may be configured to determine the internet speed test data, which may include connection characteristics such as a download speed, an upload speed, a ratio of download speed to upload speed (DL/UL), jitter, latency, and a geographical region in which the client device 13 is located. In one embodiment, the program may be configured to display on the display 87 a graphical user interface (GUI), which may be arranged to present internet speed test data results of the internet speed test. In another embodiment, the client software program may transmit at least some of the internet speed test data to the server 11, which may be used by the server to train and/or test a user-sentiment model 18. More about the model is described herein.

In one embodiment, the client software program 84 may also be configured to display a UI item in the GUI, requesting feedback regarding the results of the internet speed test. For example, the feedback may indicate (or include) a user-provided sentiment score associated with the internet speed test data. As an example, the software program may request that the user of the client device 13 rate the speed test data between a range of numbers (e.g., between zero to five, where zero indicates that the user is displeased with the results and five indicates that the user is pleased with the results). In another embodiment, the GUI may request that the user of the client device indicate specific data points of which the user is pleased or displeased. In some embodiments, the client software program 84 may provide the user with the ability to include comments. Once user-feedback is received, the client software program 84 may be configured to cause the client device, via the network interface 81, to transmit the feedback (user-provided sentiment score) to the server 11. In one embodiment, the feedback may be transmitted to the server with or separate from the internet speed test data.

The server 11 includes a network interface 14, a controller 15, and memory 16. In another embodiment, the server may include other elements, such as one or more input devices. The memory 16 includes a server software program 17, a user-sentiment model 18, internet speed test data 19, and predicted user-sentiment scores 80. In one embodiment, the server may be a server of an internet speed test provider that may be configured to perform internet speed tests of data connections with one or more client devices, such as device 13. Along with or in lieu of performing speed tests, the server may be configured to predict user sentiment of users of client devices that perform speed tests. For instance, the server 11 may perform speed tests and/or predict user sentiment.

The server software program 17 may be any type of software program, which when executed by the controller 15 may communicate with one or more devices over a network and may perform one or more internet speed test operations, as described herein. The server program may be configured to perform an internet speed test with one or more client devices, where the server may transmit test data to the client device in order for the client device to determine (estimate) internet speed test data. The server 11 may be configured to receive internet speed test data 19 from the client device 13, and store the data in memory 16. In another embodiment, the server program 17 may perform any type of internet speed test technique in order for the system 10 to benchmark a data connection with the client device 13. For instance, the server program 17 may be configured to measure at least some internet speed test data (e.g., upload speed) when performing an internet speed test with the client device.

The internet speed test data 19 may include one or more connection characteristics determined from internet speed tests conducted by one or more client devices. For instance, at least some internet speed test data 19 may be determined from internet speed tests performed between the server 11 (and/or other internet speed test servers) and one or more client devices, such as device 13. In another embodiment, the server 11 may receive data of internet speed tests performed by other devices (e.g., between other internet speed test servers and client devices). For instance, the speed test data 19 may be received from internet speed test servers that have conducted speed tests with client devices. In which case, once a client device completes the speed test, the device may transmit connection characteristics and/or feedback to one or more internet speed test servers, which may include server 11. In one embodiment, the internet speed test data 19 may have been compiled over a period of time (e.g., weeks, months, years) from several client devices over many geographical regions, such as cities, states, countries. In another embodiment, a geographical region may be any type of area of land. For instance, a geographical region may be one of several non-overlapping areas of land, such as a 500 square-meter of land.

In one embodiment, the internet speed test data 19 may include at least some of the connection characteristics described herein, such as the ratio of DL/UL. In one embodiment, the test data 19 may include (or be associated with) user-provided sentiment of client devices to which the data 19 may be associated. In one embodiment, the test data 19 may be labeled data, which may be used to train (and/or test) the user-sentiment model 18. In particular, the data 19 may be labeled based on associated user-provided sentiment. For instance, when the user-provided sentiment is a score between zero and five, the data may be labeled with an associated numerical score provided by the user of the client device from which the data was produced. In another embodiment, the data may be labeled with one or more other labels, such as a geographical label that indicates the geographical region in which an associated client device is located when the internet speed test data was determined. In another embodiment, the test data 19 may include connection characteristics with associated user-provided sentiment and/or characteristics that may not be associated with user-provided sentiment.

The user-sentiment model 18 (hereafter may be referred to as "model") may be a machine learning (ML) that may be trained to predict user sentiment from results of internet speed tests of one or more client devices. In particular, the model 18 may be trained using at least some of the internet speed test data 19 to predict user-sentiment. For instance, the model may utilize supervised learning techniques using labeled internet speed test data 19 to predict sentiment ratings (scores) without sentiment labels. In particular, the model may be trained to predict user-sentiment for internet speed tests, where users may not have provided any (or sufficient) feedback relating to the test in order to provide a more comprehensive understanding of user (customer) satisfaction. In one embodiment, the model may be any type of machine learning model, such as a Random Forest, a Randomized Search, a neural network, or a regression model. The model may be configured to output predicted user-sentiment scores responsive to one or more connection characteristics of internet test data.

In one embodiment, the model 18 may be trained to predict user sentiment based on the geographical region in which the client device is located. In particular, the model may be trained to predict sentiment to account for regions, such as cities, states, countries, etc. In which case, the model take into account (e.g., as a label) region by being trained using region-specific internet speed test data. For example, to train the model to predict sentiment for a given region, the system may compile previous internet test data for the given region and then use the data to train the model. As a result, the model my predict different sentiments for different regions. In one embodiment, compiled internet speed test data with associated user-provided sentiment of a region, where the provided sentiment is below average, may train the model such that predicted sentiment for the region is lower than predicted sentiment for another region. As a result, the model may predict different sentiments for the same internet test data for different regions. For example, when regions are cities, the user-sentiment model 18 may be configured to predict that an internet speed test of a client device in Los Angeles, California result in predicted user sentiment of 3.5 for a first set of connection characteristics, such as a particular ratio of DL/UL as input into the model. For predicting sentiment of an internet speed test for another client device in Denver, Colorado, using at least some of the same connection characteristics, such as the same ratio as input, the model may predict user sentiment as 4. This may be the case when sentiment in different regions may vary even though they may experience the same results of internet speed tests. More about predicting different sentiment for similar results is described herein. In another embodiment, the memory 16 may include multiple user-sentiment models, each model for a given geographical region.

In another embodiment, the model 18 may be trained using multiple connection characteristics in order to provide a more accurate predicted user sentiment. Continuing with the previous example, the model may predict different sentiment for two client devices that include at least some of the same internet test data, due to having at least some different test data. For example, two internet speed tests may result in the same DL/UL, but may have differing download speeds and/or upload speeds. For instance, one client device may provide a DL/UL of 1.1, if DL=110 and UL=100, and another client device may provide a same DL/UL of 1.1, but have vastly different download/upload, such as a DL=1.1 and UL=1. In which case, the model may use download speed and/or upload speed as other inputs to take into account these differences, which would result in user-sentiment for both devices being different since the first device enjoys faster upload and download speeds than the other device.

In one embodiment, the model 18 may be based on historical internet speed test data. As described herein, the server may compile speed test data and/or user feedback over time, such as months, years, etc. As a result, the model 18 may be trained using this past data in order to provide an accurate prediction of user sentiment for a given geographical region. In another embodiment, the model 18 may be updated (adapted) to changes to internet speed test data (over a period of time). For example, as user-provided sentiment improves, the model may be trained to adapt predicted sentiment based on the improvement.

The predicted user-sentiment scores 80 may be the results of the model 18. As described herein, the scores may be numerical (e.g., values between zero and five). As another example, the scores may be or relate to one or more connection characteristics that are derived during the internet speed test. For instance, the score may indicate whether a user of the client device is satisfied or dissatisfied with a given characteristic, such as download speed. In another embodiment, the scores 80 may include written comments from users of client devices. In some embodiments, the scores may be any type of indication of user sentiment relating to the results of internet speed tests.

Figure 2:
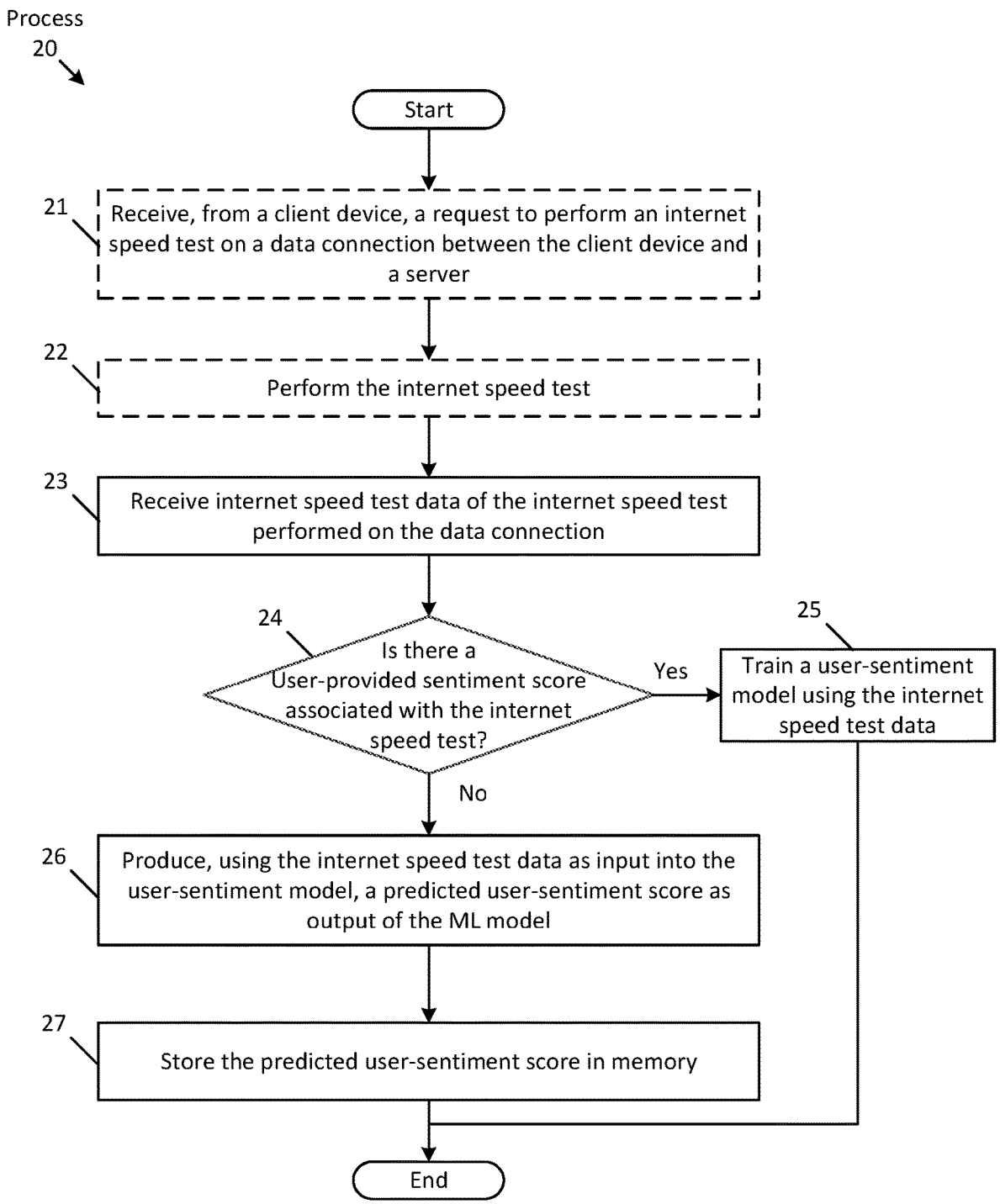
FIG. 2 is a flowchart of one embodiment of a process to predict user sentiment of an internet speed test, according to some embodiments.

FIG. 2 is a flowchart of one embodiment of a process 20 to predict user sentiment of an internet speed test, according to some embodiments. In one embodiment, at least some of the operations may be performed by (e.g., the server 11 of) the system 10). For example, at least some operations may be performed by the (e.g., server software program 17 that may be executed by the) controller 15. The process 20 begins with the controller 15 receiving, from a client device 13, a request to perform an internet speed test on a data connection between the client device and the server (at block 21). As described herein, a user of the client device 13 may execute the client software program 84 for conducting an internet speed test. The program may include a GUI that may be displayed on display 87 of the client device 13, which may include a UI item that may cause the client device to transmit the request, via the network 12, to the server 11 in response to receiving user input through an input device 88. The controller 15 may perform the internet speed test (at block 22). As described herein, the controller 15 may cause the server 11 to transmit test data to the client device, which may use the data to produce internet speed test data.

The controller 15 receives internet speed test data of the internet speed test performed on the data connection (at block 23). In particular, the controller 15 may determine test data of a speed test performed for a data connection between a client device and the server 11. In another embodiment, the controller 15 may receive the data of a speed test performed between the client device and another (e.g., remote) server, which may be a separate (standalone) internet speed test server. The controller 15 determines whether there is a user-provided sentiment score associated with the internet speed test (at decision block 24). Specifically, the controller 15 may determine whether the client device had provided (e.g., transmitted) feedback that may include or indicate user-provided sentiment based on the received internet speed test data. For instance, once internet speed test is performed, the client device may provide a user of the device with an option to provide feedback. If feedback is provided, the client device may transmit the feedback along with the internet speed test data to the server 11. Otherwise, if no feedback is provided (e.g., no feedback received by the client software program 84 within a period of time after the performance of the speed test or the user of the client device does not select a UI item for providing feedback), the client device 13 may transmit the internet speed test data without user-provided feedback (and/or an indication that no user feedback is provided with the internet speed test data).

In response to determining that the internet speed test data does include user feedback from the client device (or that user feedback is provided by the client device that may be associated with received internet speed test data), the controller 15 trains the user-sentiment model 18 using the internet speed test data (at block 25). In which case, the controller may label at least some of the received test data based on the user feedback, and then may train (and/or test) the model using the labeled data. As a result, the system may train the model 18 using received test data associated with user feedback. In particular, the controller may receive test data that includes internet speed test data of several internet speed tests and includes feedback (user-provided sentiment scores) associated with the test data, and may use the received test data (labeled based on the user-provided sentiment) to train the model.

If, however, user-feedback is not provided by the client device 13, the controller 15 produces, using the received internet speed test data as input into the model 18, a predicted user-sentiment score as output of the model (at block 26). In one embodiment, the predicted user sentiment may be a prediction of the type of (or amount of) sentiment that the user of the client device would have expressed if provided user-feedback of the results of the internet speed test. In one embodiment, the predicted user-sentiment score may relate to overall sentiment of a user of the client device with respect to the internet speed test data. For example, the client software program may request that the user rate the user's experience numerically from zero to five, where zero may indicate an overall unsatisfactory user-sentiment of the (results of the) test and five may indicate an overall satisfactory user-sentiment.

In another embodiment, the predicted user-sentiment score may be based on at least a portion of the internet speed test data. For example, the model may predict user-sentiment using one or more connection characteristics as input. In which case, the user-sentiment may relate to (or be associated with) those input characteristics. For instance, when download speed is input into the model, the model may output user-sentiment relating to the download speed. In another embodiment, the controller may use other characteristics to predict sentiment. For instance, in the case in which the memory 16 includes different models for different regions, the controller 15 may be configured to extract a user-sentiment model associated with (trained to predict scores for) a given geographical region associated with the internet sped test data, and then may use the model to predict sentiment, as described herein. The controller 15 may store the predicted user-sentiment score in memory 16, in and along with the stored scores 80 (at block 27). In one embodiment, the system may compile (store) predicted user-sentiment scores 80 over a period of time, and may transmit the predicted scores to one or more network operators that provide network services to client devices in order to provide user (customer) insight.

In one embodiment, at least some of the operations of process 20 may be optional, such as blocks 21 and 22. This may be the case in which the server 11 may not provide the internet speed test for a data connection of the client device, but instead may be performed by another remote server. Once the test is complete, the client device 13 (and/or the remote server) may transmit the internet speed test data and/or any user feedback associated with the data.

In another embodiment, the system may perform at least some of these operations over a period of time in order to continuously train the user-sentiment model 18 to learn and improve predictions over time as more labeled data becomes available. As a result, the user-sentiment model may adapt and remain up-to-date with user sentiment (which may change over time in a given geographical region) in order to ensure that sentiment prediction remains accurate (for the given region).

As described herein, the model 18 may be trained to predict different user-sentiment scores based on the geographical regions associated with client devices. For example, the controller 15 may receive the same (or at least some similar) test data from different client devices located in different regions. The model may produce a higher predicted user-sentiment score for one set of test data than another predicted user-sentiment score for another set of test data. This may be due to the fact that test data associated with both regions may be labeled differently. For example, the region for which a higher predicted user-sentiment score is produced may provide user-provided sentiment that is higher than this user-provided sentiment from the other region, with which the model 18 may be trained.

In another embodiment, the user-sentiment model 18 may provide a more accurate assessment of user sentiment than actual user-provided sentiment. As described herein, less than 2% of clients that conduct internet speed tests may provide user-feedback. In which case, users who receive less satisfactory results of a speed test (e.g., low download speeds) may be more inclined to provide negative feedback than users who experience satisfactory results (e.g., higher download speeds). As a result, user-provided sentiment (e.g., for a given region) may be lower than the actual user-sentiment (e.g., on average) of users who conduct internet speed tests within that region, since most users (e.g., above a threshold of users) that conduct the internet speed test who receive good speed test results may not provide (e.g., negative) feedback. The system 10 may train the model 18 to take into account (and adjust) user-predicted sentiment so that it reflects the actual user sentiment, as opposed to a lower (or higher) sentiment reflected by only a handful of outlier feedback.

Figure 3:
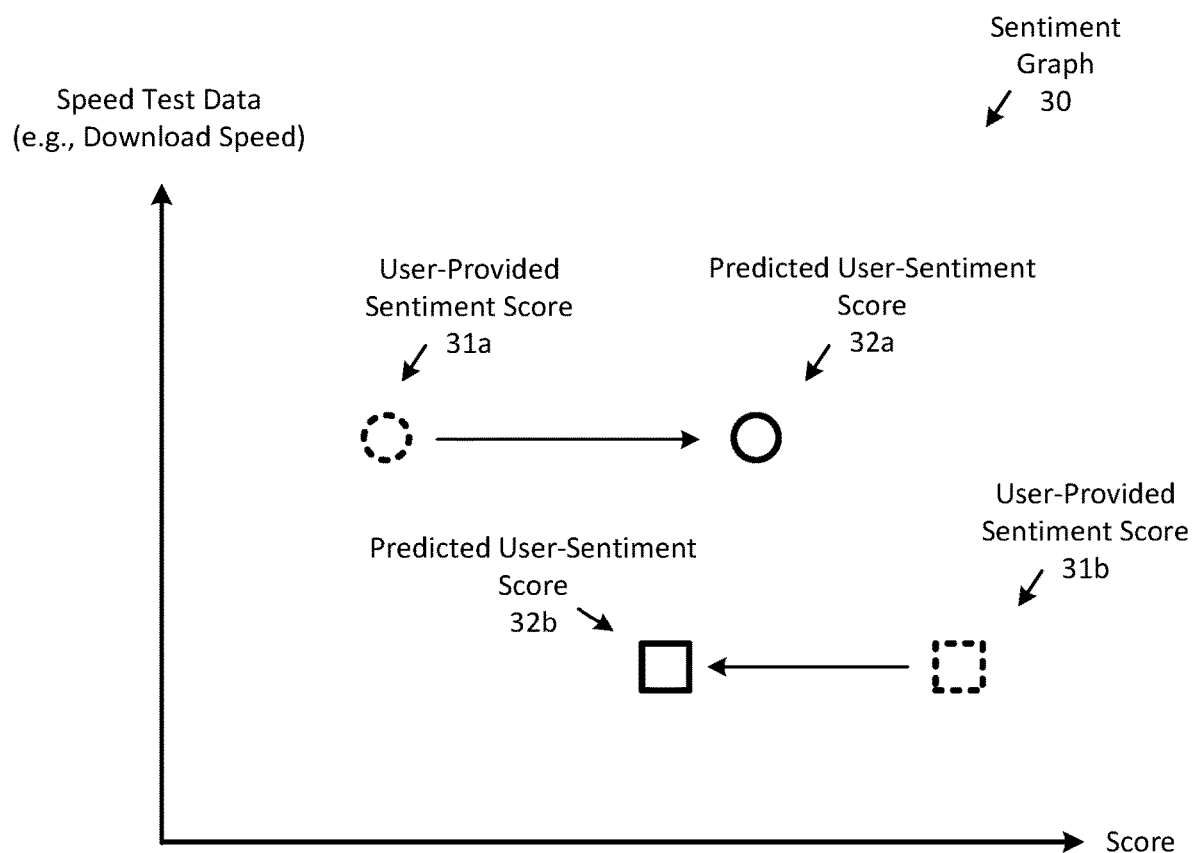
FIG. 3 illustrates a sentiment graph that shows differences between user-provided sentiment and predicted user sentiment according to one embodiment.

FIG. 3 illustrates a sentiment graph 30 that shows differences between user-provided sentiment and predicted user sentiment according to one embodiment. In particular, this graph 30 shows how the user-sentiment model 18 may predict a more accurate assessment of user sentiment that may be different than user-provided sentiment (e.g., on average), for a particular geographical region, for example.

The graph 30 shows sentiment scores with respect to internet speed test data, such as download speed. The graph includes several user-provided sentiment scores and several predicted user-sentiment scores. In particular, the internet speed test data of the graph may represent an average (or overall) representation of one or more measured connection characteristics for one or more internet speed tests. The user-provided scores, however, may be (based on) scores provided by a portion of users who conducted the internet speed tests. As a result, the illustrated user-provided scores may not reflect an accurate depiction of actual user sentiment, since the scores may be only based on a portion of user provided feedback (e.g., which may be overall negative).

The graph 30 includes a first user-provided sentiment score 31a and a second user-provided sentiment score 31b. Each of the user-provided sentiment scores may be associated with a particular graphical region and may be an average score of several user-provided scores (based on several internet speed tests performed for the several client devices located within their respective regions). Each of the scores may not reflect an accurate representation of user sentiment within their respective regions based on the internet speed test data. For instance, the first score 31a may represent an average of user-provided sentiment for client devices within Los Angeles, California and the second score 31b may represent an average of user-provided sentiment for client devices within Denver, Colorado. Although clients in Los Angeles experience better internet speed test data (e.g., faster download speeds) than Denver Colorado, the first score 31a is lower than the user-provided sentiment score 31b of Denver.

The inconsistency between the two scores may be based on various factors. For example, a vast majority (e.g., above a threshold) of users within Los Angeles who provide feedback may be those who experience worse internet speed test results than an average of all of the users within Los Angeles. These users may provide worse feedback (on average) than users of Denver, even though users of Los Angeles on average have better internet speed test results than those in Denver. The user-provided sentiment score 31b of Denver, on the other hand, may be the result of some users providing higher positive feedback (e.g., numerical values higher than values provided by users in Los Angeles who provided feedback) than an overall user-sentiment of users within Denver. This may be the case when the users (who may represent less than 50% of the total population of Denver or less than 50% of users within Denver who have performed internet speed tests) providing the feedback have better download speed than an average download speed of the users within Denver, thereby providing better sentiment scores than expected for the average population.

The model 18 takes into account this outlier feedback and may produce predicted user-sentiment scores to reflect actual user sentiment, which may be over a larger population than that of the user-provided sentiment. In one embodiment, the model 18 may be trained using past internet speed test data that includes user-feedback from other client devices that are located within a same geographical region as a client device. In particular, the graph 30 shows two predicted user-sentiment scores 32*a* and 32*b*, associated with regions of the user-provided scores 31*a* and 31*b*. Specifically, the first predicted score 32*a* for a client device located within Los Angeles (which did not provide user feedback) is greater than the average user-provided sentiment score 31*a*, while the second predicted score 32*b* for a client device located in Denver is less than the average user-provided sentiment score 31*b*. Both of these scores may be predicted using connection characteristics, such as download speed that the server 11 receives from each of these devices, as described herein. In one embodiment, the model 18 may predict a more accurate user sentiment based on training data (e.g., over one or more regions) that may indicate that there is higher user sentiment for the overall population when internet speed test data reflects a better data connection (e.g., faster download speed).

As previously explained, an embodiment of the disclosure may be a non-transitory machine-readable medium (such as microelectronic memory) having stored thereon instructions, which program one or more data processing components (generically referred to here as a "processor") to perform at least some of the operations described herein. In other embodiments, some of these operations might be performed by specific hardware components that contain hardwired logic. Those operations might alternatively be performed by any combination of programmed data processing components and fixed hardwired circuit components.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the claim.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
   receiving internet speed test data of an internet speed test performed on a data connection between a client device and a remote server;
   determining whether there is a user-provided sentiment score associated with the internet speed test data; and
   in response to determining that there isn't the user-provided sentiment score, producing, using the internet speed test data as input into a machine learning (ML) model, a predicted user-sentiment score as output of the ML model, wherein the predicted user-sentiment score relates to an overall sentiment of a user of the client device with respect to the internet speed test data.

2. The method of claim 1, wherein the internet speed test data comprises at least one of a download speed, an upload speed, a ratio of download speed to upload speed (DL/UL), jitter, latency, and a geographical region in which the client device is located.

3. The method of claim 2, wherein the geographical region is a first geographical region, the internet speed test is a first internet speed test, the data connection is a first data connection, the client device is a first client device, the predicted user-sentiment score is a first predicted user-sentiment score, and the internet speed test data is a first set of internet speed test data, wherein the method further comprises:
   receiving a second set internet speed test data of a second internet speed test performed on a second data connection between a second client device and the remote server, wherein the second client device is at a second geographical region, wherein the second set of internet speed test data comprises a same ratio of DL/UL as the first set of speed test data; and
   producing, using the second set of internet speed test data as input into the ML model, a second predicted user-sentiment score as output of the ML model, wherein the second predicted user-sentiment score is different than the first predicted user-sentiment score.

4. The method of claim 1, wherein the internet speed test is performed while the client device is located within a geographical region, wherein the predicted user-sentiment score is greater than or less than an average user-provided sentiment score of a plurality of internet speed tests performed for a plurality of client devices located within the geographical region.

5. The method of claim 1 further comprising:
   receiving training data that includes internet speed test data of a plurality of internet speed tests and includes user-provided sentiment scores associated with the internet speed test data of the plurality of internet speed tests; and
   using the received training data to train the ML model.

6. The method of claim 1 further comprising, in response to determining that there is the user-provided sentiment score associated with the internet speed test data, training the ML model using the user-provided sentiment score and at least some of the internet speed test data.

7. The method of claim 1, wherein the ML model is at least one of a Random Forest, a Randomized Search, a Neural Network, and a regression model.

8. The method of claim 1, wherein the receiving, the determining, and the producing are performed by the remote server.

9. A server, comprising:
   at least one processor; and
   memory having stored therein instructions which when executed by the at least one processor causes the server to:

determine internet speed test data of an internet speed test performed for a data connection with a client device;

determine whether the client device has provided feedback relating to the internet speed test data;

in response to determining that the client device has not provided feedback, estimating, using a machine learning (ML) model, a predicted user-sentiment score based on at least a portion of the internet speed test data, wherein the predicted user-sentiment score relates to user sentiment of the internet speed test data; and store the predicted user-sentiment score in the memory.

10. The server of claim 9, wherein the internet speed test data comprises at least one of a download speed, an upload speed, a ratio of download speed to upload speed (DL/UL), jitter, latency, and a geographical region in which the client device is located.

11. The server of claim 10, wherein the geographical region is a first geographical region, the internet speed test is a first internet speed test, the data connection is a first data connection, the client device is a first client device, the predicted user-sentiment score is a first predicted user-sentiment score, and the internet speed test data is a first set of internet speed test data, wherein the memory has further instructions to:

receive a second set internet speed test data of a second internet speed test performed on a second data connection with a second client device, wherein the second client device is at a second geographical region, wherein the second set of internet speed test data comprises a same ratio of DL/UL as the first set of speed test data; and produce, using the second set of internet speed test data as input into the ML model, a second predicted user-sentiment score as output of the ML model, wherein the second predicted user-sentiment score is different than the first predicted user-sentiment score.

12. The server of claim 9, wherein the internet speed test is performed while the client device is located within a geographical region, wherein the predicted user-sentiment score is greater than or less than an average user-provided sentiment score of a plurality of internet speed tests performed for a plurality of client devices located within the geographical region.

13. The server of claim 9, wherein the memory has further instructions to:

receive training data that includes internet speed test data of a plurality of internet speed tests and includes feedback associated with the internet speed test data of the plurality of internet speed tests; and use the received training data to train the ML model.

14. The server of claim 9, wherein the memory has further instructions to, in response to determining that there is feedback that comprises a user-provided sentiment score, train the ML model using the user-provided sentiment score and at least some of the internet speed test data.

15. The server of claim 9, wherein the ML model is at least one of a Random Forest, a Randomized Search, a Neural Network, and a regression model.

16. A non-transitory machine-readable medium having stored therein instructions which when executed by at least one processor of an electronic device causes the electronic device to:

receive internet speed test data of an internet speed test performed on a data connection between a client device and a remote server, wherein the internet speed test data does not comprise user feedback from the client device; and produce, using the internet speed test data as input into a machine learning (ML) model, a predicted user-sentiment score as output of the ML model, wherein the predicted user-sentiment score relates to overall sentiment of a user of the client device with respect to the internet speed test data.

17. The non-transitory machine-readable medium of claim 16, wherein the internet speed test data comprises at least one of a download speed, an upload speed, a ratio of download speed to upload speed (DL/UL), jitter, latency, and a geographical region in which the client device is located.

18. The non-transitory machine-readable medium of claim 17, wherein the geographical region is a first geographical region, internet speed test is a first internet speed test, the data connection is a first data connection, the client device is a first client device, the predicted user-sentiment score is a first predicted user-sentiment score, and the internet speed test data is a first set of internet speed test data, wherein the non-transitory machine-readable medium further comprises instructions to:

receive a second set internet speed test data of a second internet speed test performed on a second data connection between a second client device and the remote server, wherein the second client device is at a second geographical region, wherein the second set of internet speed test data comprises a same ratio of DL/UL as the first set of speed test data; and produce, using the second set of internet speed test data as input into the ML model, a second predicted user-sentiment score as output of the ML model, wherein the second predicted user-sentiment score is different than the first predicted user-sentiment score.

19. The non-transitory machine-readable medium of claim 16, wherein the internet speed test is performed while the client device is located within a geographical region, wherein the predicted user-sentiment score is greater than or less than an average user-provided sentiment score of a plurality of internet speed tests performed for a plurality of client devices located within the geographical region.

20. The non-transitory machine-readable medium of claim 16, wherein the ML model is trained using past internet speed test data that includes user-feedback from other client devices that are located within a same geographical region as the client device.

* * * * *